United States Patent
Öhman et al.

(10) Patent No.: US 12,212,248 B2
(45) Date of Patent: Jan. 28, 2025

(54) MODULAR MMC PHASE ARM AND CONTROL THEREOF

(71) Applicant: Hitachi Energy Ltd, Zürich (CH)

(72) Inventors: Jimmy Öhman, Ludvika (SE);
Ying-Jiang Hafner, Ludvika (SE);
Christer Sjöberg, Ludvika (SE);
Daniel Hallmans, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 197 days.

(21) Appl. No.: 18/015,008

(22) PCT Filed: Jul. 7, 2020

(86) PCT No.: PCT/EP2020/069045
§ 371 (c)(1),
(2) Date: Jan. 6, 2023

(87) PCT Pub. No.: WO2022/008036
PCT Pub. Date: Jan. 13, 2022

(65) Prior Publication Data
US 2023/0344363 A1    Oct. 26, 2023

(51) Int. Cl.
*H02M 7/483* (2007.01)
*H02M 1/00* (2007.01)

(52) U.S. Cl.
CPC ....... *H02M 7/4835* (2021.05); *H02M 7/4833* (2021.05); *H02M 1/0003* (2021.05)

(58) Field of Classification Search
CPC . H02M 1/0003; H02M 7/4833; H02M 7/4835
See application file for complete search history.

(56) References Cited

U.S. PATENT DOCUMENTS

| 7,230,837 B1 * | 6/2007 | Huang | H02J 3/1857 |
| | | | 363/71 |
| 2015/0162848 A1 * | 6/2015 | Harnefors | H02M 7/539 |
| | | | 363/78 |

(Continued)

FOREIGN PATENT DOCUMENTS

CN    107947213 A    4/2018

OTHER PUBLICATIONS

Zhou et al., "A Prototype of Modular Multilevel Converters", IEEE Transactions on Power Electronics, vol. 29, No. 7, Jul. 2014, p. 3267-3278.

(Continued)

*Primary Examiner* — Jue Zhang
(74) *Attorney, Agent, or Firm* — Procopio, Cory, Hargreaves & Savitch LLP

(57) ABSTRACT

There is provided a method of controlling a plurality of converter cells in a phase arm of a modular multilevel converter (MMC) in accordance with a main reference. The method includes dividing the main reference into a plurality of reference parts, and, by using a grouping of the plurality of converter cells into a plurality of groups, operating a plurality of modulators in parallel, each modulator controlling a respective one of the groups of converter cells in accordance with one of the reference parts. A phase arm controlled in accordance with such a method is also provided, as well as an MMC including at least one such phase arm, and a converter station including at least one such MMC.

7 Claims, 3 Drawing Sheets

(56) References Cited

U.S. PATENT DOCUMENTS

2016/0164399 A1* 6/2016 Mueller .............. H02M 1/4216
　　　　　　　　　　　　　　　　　　　　　323/207
2017/0085193 A1* 3/2017 Akagi ................... H02M 7/537
2018/0083550 A1　3/2018 Chung et al.

OTHER PUBLICATIONS

Zhou et al., "A Control System for Large-Scale Modular Multilevel Converters", p. 163-168, IEEE, 2013.

* cited by examiner

# MODULAR MMC PHASE ARM AND CONTROL THEREOF

CROSS-REFERENCE TO RELATED APPLICATIONS

The present application is a national stage entry of International Patent App. No. PCT/EP2020/069045, filed on Jul. 7, 2020, which is hereby incorporated herein by reference as if set forth in full.

TECHNICAL FIELD

The present disclosure relates to the field of modular multilevel converters, MMCs, for power conversion. In particular, the present disclosure relates to control of a phase arm in such an MMC.

BACKGROUND

Due to their performance in terms of e.g. reduced harmonics and improved efficiency, modular multilevel converters, MMCs, are used to transfer electrical power between power grids of different types, for example between an AC grid and a DC grid. The harmonic performance of MMCs may be at least partly attributed to them using a large number of converter cells (or submodules) in each phase arm (or phase valve), which allows for the MMC to synthesize e.g. a voltage waveform which closely matches that of a sine-wave.

However, due to the large number of converter cells (often several hundred or more in each phase arm), control of the MMC is more complex compared to other converter topologies, such as for example the older two-level converter. Balancing the converter cell voltages of all of the converter cells, multiple times per second, may require a control unit having substantial computing power in order to control all of the converter cells according to a main reference. With limited computing power available, this may also limit an overall performance of the MMC.

SUMMARY

The present disclosure seeks to at least partly remedy the above discussed issue. To achieve this, a method of controlling a plurality of converter cells in a phase arm of an MMC, a phase arm for an MMC, an MMC, and a converter station as defined by the independent claims are provided. Further embodiments are provided in the dependent claims.

According to a first aspect of the present disclosure, there is provided a method of controlling a plurality of converter cells in a phase arm (or phase valve) of an MMC in accordance with a main reference. The method may include dividing the main reference into a plurality of reference parts. The method may also include, by using a grouping of the plurality of converter cells into a plurality of groups, operating a plurality of modulators in parallel, where each modulator controls a respective one of the groups of converter cells in accordance with one of the reference parts. The MMC may for example be a voltage source controller (VSC).

Herein, that the converter cells are grouped into a plurality of groups may not necessarily require them to be physically grouped together. Phrased differently, the grouping of converter cells into groups may also be purely logical/abstract, such that e.g. the grouping may be changed at a later stage without requiring any or major physical alteration of the phase arm.

A "main reference" may for example be a control signal indicating a voltage value which is to be tracked (e.g. synthesized) by proper control of the converter cells in the phase arm. That the phase arm is operated in accordance with such a main reference is taken to mean that the output of the phase arm (i.e. a combined voltage of all its converter cells) sufficiently matches (or tracks) the main reference (e.g. at an instance, or also over time).

A "modulator" may for example be a device or control function (implemented either in hardware, software or a combination thereof) which takes as an input a reference part, and which controls a group of converter cells such that the combined output voltage of the group of converter cells are in accordance with (e.g. synthesizes) the received reference part. As will be described herein in more detail, such controlling of a converter cell may include sending the modulator sending one or more command signals to the converter cell, such that the converter cell may either insert or bypass its storage capacitor(s) into/from a current path between the terminals of the converter cell.

A "reference part" may for example be a partial contribution to the main reference, such that if each modulator is able to control its group of converter cells to track a reference part, the combined state of all the converter cells in the phase arm will still be in accordance with the main reference.

That the modulators are operated "in parallel" is here taken to mean that e.g. two modulators may simultaneously focus on their respective tasks, i.e. such that each modulator individually (that is, independent of what the other modulators are doing) causes or controls its group of respective converter cells to make them e.g. output a combined voltage in accordance with the reference part. Herein, it should be noted that "independent of" or "individually" does not necessarily forbid there to be any exchange of information whatsoever between the modulators. It is envisaged that even if there for example is some exchange of e.g. synchronization information or similar between the modulators, their operation is still regarded as being parallel as long as the modulators simultaneously attempt to control their respective groups of converter cells in accordance with their respective reference parts.

As will be described later herein, a shift from a conventional use of a single modulator (which needs to control all the converter cells in a phase arm) towards a use of multiple modulators operating in parallel (each controlling a respective group of converter cells) may for example reduce a time needed for controlling all of the converter cells in the phase arm to a desired state. Consequently, performance of the MMC may be increased due to a reduced overall latency of the control.

In some embodiments, the main reference may be a voltage value, and the main reference may be divided such that a sum of the reference parts corresponds to (i.e. equals or at least approximately equals) the voltage value of the main reference.

In some embodiments, each modulator may control its respective group of converter cells according to a sorting criterion. As already mentioned above, using a plurality of modulators operating in parallel to sort the converter cells in a phase arm (instead of using a single modulator) may improve performance of the MMC.

In some embodiments, such a sorting criterion may include an increasing or decreasing converter cell voltage.

In some embodiments, the method may include each modulator balancing a voltage of its respective group of converter cells based on the sorting. For example, a modulator may be operated such that its converter cells having a lowest voltage (and/or a lowest energy level) are charged first during a charging cycle of the phase arm, and such that its converter cells having a highest voltage (and/or a highest energy level) are discharged first during a discharging cycle of the phase arm. By properly balancing the cell voltages, such that cells are charged and discharged at correct times, may for example improve an efficiency of the power conversion performed by the MMC.

In some embodiments, one group of converter cells controlled by one of the modulators may include converter cells of a first type, and another group of converter cells controlled by another one of the modulators may include converter cells of a second type different from the first type.

According to a second aspect of the present disclosure, a phase arm (or phase valve) for an MMC is provided. The phase arm may include a plurality of modulators (such as e.g. described above) and a plurality of converter cells groupable into a plurality of groups of converter cells (also as e.g. described above). Each modulator may be configured to receive a reference part of a main reference and to, independent of and in parallel with any other modulator in the phase arm, control a respective one of the groups of converter cells in accordance with the received reference part.

In some embodiments, the phase arm may be further configured to receive the main reference, to divide the received main reference into a plurality of reference parts, and to provide one of the reference parts to each modulator.

In some embodiments, one group of converter cells controlled by one of the modulators may include converter cells of a first type, and another group controlled by another one of the modulators may include converter cells of a second type different from the first type.

In some embodiments, the first type may be a half-bridge (HB) converter cell type, and the second type may be a full-bridge (FB) converter cell type.

According to a third aspect of the present disclosure, a modular multilevel converter (MMC) is provided. The MMC may include at least one phase arm as described herein with reference to the first aspect and/or the second aspect.

According to a fourth aspect of the present disclosure, a converter station is provided. The converter station may include at least one MMC as described herein with reference to the third aspect. In some embodiments, the station may be a HVDC converter station.

The present disclosure relates to all possible combinations of features recited in the claims. Objects and features described according to the first aspect may be combinable with, or replaced by, objects and features described according to the second aspect, the third aspect, and/or the fourth aspect, and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which.

Figure 1A:
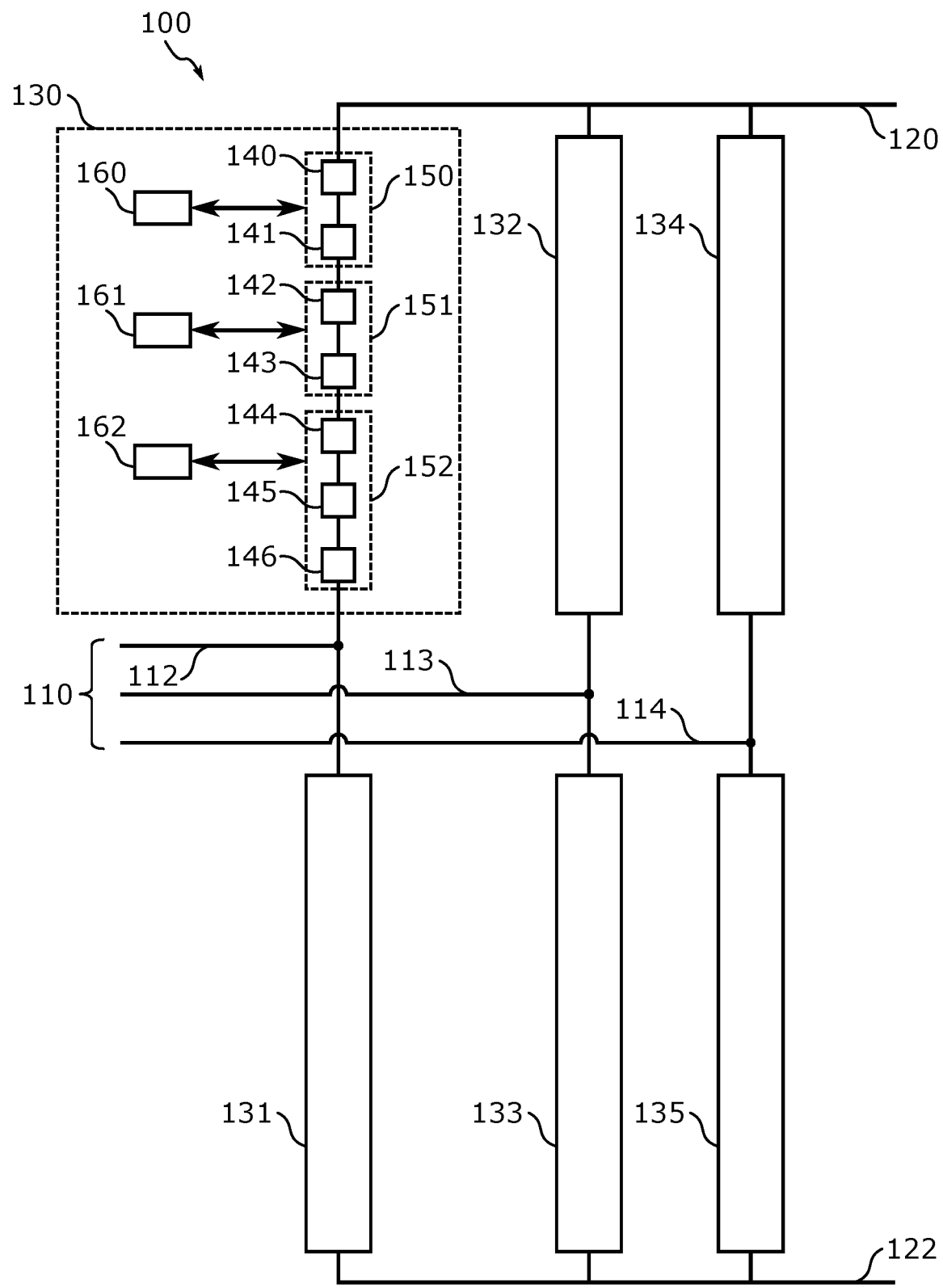
FIG. 1a illustrates schematically a modular multilevel converter, MMC, including a phase arm according to one or more example embodiments of the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION

Figure 1B:
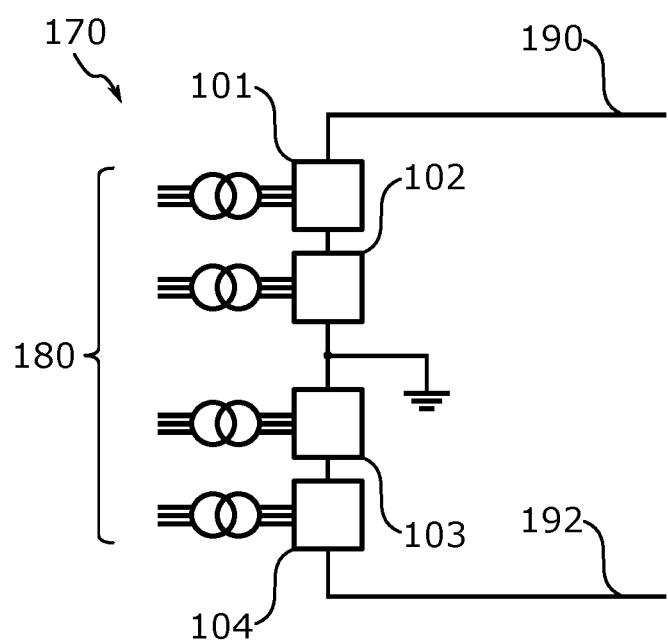
FIG. 1b illustrates schematically a converter station including at least one MMC according to one or more example embodiments of the present disclosure.
Figure 2:
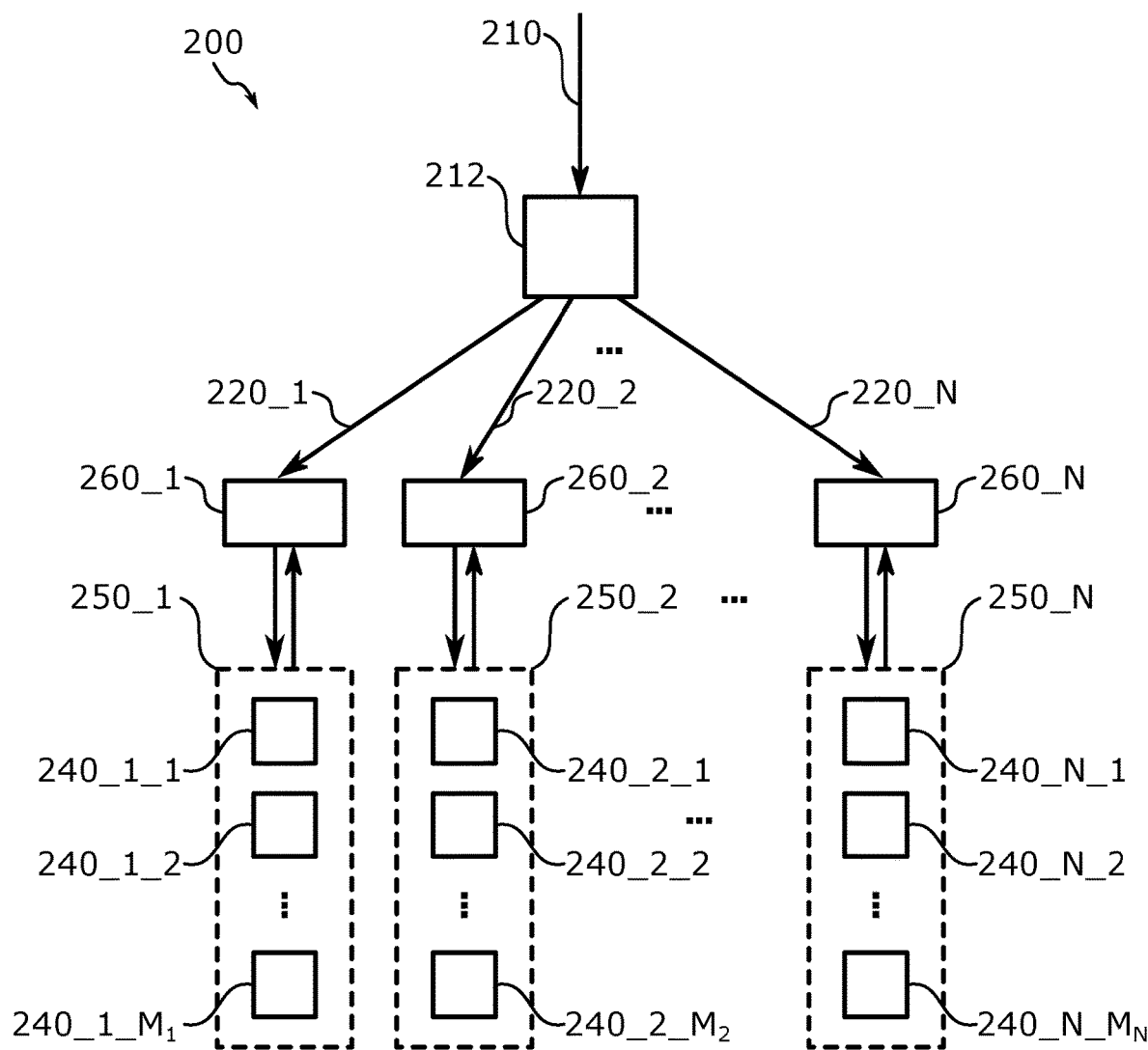
FIG. 2 illustrates schematically a strategy (method) of controlling a phase arm according to one or more example embodiments of the present disclosure.

With reference to FIGS. 1a, 1b and 2, the concept of the present disclosure will now be described in more detail.

FIG. 1a illustrates schematically an example of an MMC 100 according to one example embodiment of the present disclosure. The MMC 100 may for example be a voltage source controller (VSC). The MMC 100 is arranged to convert power between an AC side 110 and a DC side (including a first DC terminal 120 and a second DC terminal 122). The AC side 110 may include one or more phases 112-114, and the MMC 100 may include one phase leg for each phase of the AC side 110.

Each such phase leg includes two phase arms. In what follows, for illustrative purposes, only the single phase 112 of the AC side 110 will be discussed, together with the parts of the MMC 100 connected to this phase 112.

For the phase 112, the MMC 100 includes a phase leg including an upper phase arm 130 and a lower phase arm 131. The upper phase arm 130 is connected between the first DC terminal 120 and the phase 112, while the lower phase arm 131 is connected between the phase 112 and the second DC terminal 122. Although not explicitly described here, it is of course envisaged that similar arrangements of phase legs and phase arms 132, 133, 134 and 135 are available also for the other phases 113 and 114 of the AC side 110.

The upper phase arm 130 includes a plurality of converter cells 140-146 connected in series between the first DC terminal 120 and the phase 112. A converter cell is envisaged as a functional unit including one or more storage capacitors (or similar devices for storing charge), and means for, in a controlled way, both insert or bypass such storage capacitor(s) into/from a current path between the terminals of the converter cell. As known to the skilled person, such inserting or bypassing of the cell storage capacitors may be achieved using e.g. IGBTs or similar switching devices arranged and controlled in a suitable manner within the converter cell. A converter cell may for example be of a half-bridge (HB) type or a full-bridge (FB) type, where, in the latter case, the converter cell may also control with what polarity the storage capacitor(s) is/are inserted in the current path between the cell terminals.

There may, of course, also be other elements included in the phase arm 130, such as for example one or more inductances, additional switches, breakers, resistances, or similar. Such additional elements are not illustrated in FIG. 1a nor discussed here.

In the (upper) phase arm 130, the plurality of converter cells 140-146 are grouped into a plurality of groups 150, 151 and 152. In the current example, the group 150 includes the converter cells 140 and 141, the group 151 includes the converter cells 142 and 143, while the group 152 includes the remaining converter cells 144, 145 and 146. It should be emphasized that the current example is for illustrative purposes only, and that e.g. a phase arm may include several hundreds of converter cells, or more, depending on e.g. a required power rating. Likewise, it is of course also envisaged that a phase arm may have many more groups than the three groups 150, 151 and 152, and or/that each group may include more than two or three converter cells each.

As described earlier herein, a "group of converter cells" does not necessarily imply or require a physical grouping of the converter cells. A group may instead be a logical grouping of the converter cells. Using the MMC 100 of FIG. 1a as an illustrative example, it may be envisaged that one group may for example instead include the converter cells 140 and 146, and one group may include the converter cells 142, 143, 144 and 145. Phrased differently, it is not required for two converter cells to be physically close, or belong to a same physical entity, for them to belong to a same group.

In the phase arm 130 of the MMC 100, there are also provided three modulators 160, 161 and 162, each configured to control a respective one of the groups 150, 151 and 152 of converter cells. Using the modulator 160 as an example, the modulator 160 may control e.g. which of the converter cells 140 and 142 that are in an "inserted" or a "bypassed" state, respectively. Here, as described earlier herein, an "inserted" state means that the converter cell in question has its storage capacitor(s) inserted into a current path between its terminals, while a "bypassed" state means that the converter cell in question does not have its storage capacitor(s) inserted into the current path between its terminals (i.e. such that a current passing between the terminals of the converter cell does not pass through the one or more storage capacitor(s) of the converter cell). By controlling the states of the converter cells, the modulator 160 may therefore regulate how many storage capacitors that are inserted in total in the current path, and thereby e.g. also regulate a total voltage across its terminals. The decision on which converter cells that should be in an inserted or a bypassed state may for example be taken by the modulator 160 based on an instruction provided to the modulator 160. Such an instruction may, as will be described later herein, include or be a reference part corresponding to e.g. a desired voltage output across the terminals of the group 150 of converter cells controlled by the modulator 160. The modulator 160 may then decide how many of its converter cells in the group 150 that need to be in an inserted state to meet the reference part (e.g. the desired voltage). To make such a decision, the modulator 160 may first measure (or be provided with) a charge (or energy) level (e.g. a voltage) for the storage capacitors of its converter cells, and then decide which converter cells that should be in what state. The decision may also, or in combination therewith, be taken based on e.g. a direction of a current in the phase arm 130. If the current in the phase arm 130 is in a direction which allows charging of the storage capacitors of the converter cells, the modulator 160 may decide (by controlling the states of its converter cells) which storage capacitors that are to be charged or not. Such a decision may also be taken based on a measurement (or provision) of a charge level of each storage capacitor, i.e. a converter cell voltage.

FIG. 1b illustrates schematically an embodiment of a converter station 170 according to the present disclosure.

The converter station 170 includes at least one MMC 101, 102, 103 and 104. One or more of the MMCs 101, 102, 103 and 104 may be the MMC 100 described above with reference to FIG. 1a. The MMCs 101-104 are connected on their AC sides to a plurality of AC grids 180. The MMCs 101-104 are connected in series, and in a bipolar configuration, where the MMC 101 and the MMC 104 connects to the respective DC pole 190 and 192 of a DC grid. The converter station 170 is configured to transfer power between the AC grids 180 and the DC grid, and may benefit from the control strategy described above due to the inclusion of at least one MMC where at least one phase arm is controlled as also described herein. In some embodiments, the converter station 170 may for example be a HVDC converter station.

FIG. 2 illustrates schematically an embodiment of a control strategy 200 (as implemented e.g. in a method and/or device as described herein) for controlling a phase arm of an MMC according to the present disclosure.

In the strategy (or method) 200, a main reference 210 includes e.g. a main reference voltage according to which a phase arm of an MMC is to be operated (i.e. controlled). In a step 212, the main reference 210 is divided into several reference parts $220\_1, 220\_2, \ldots, 220\_N$, where N is an integer number greater than one. Each reference part $220\_1, 220\_2, \ldots, 220\_N$ is then provided to a respective modulator $260\_N, 260\_2, \ldots, 260\_N$ of the phase arm of the MMC. For example, the modulator $260\_1$ may correspond to the modulator 160 in the phase arm 130 described herein with reference to FIG. 1, the modulator $260\_2$ may correspond to the modulator 161, and so on and so forth.

After having received its respective reference part, each modulator $260\_1, 260\_2, \ldots, 260\_N$ uses its received reference part to control a respective group $250\_1, 250\_2, \ldots, 250\_N$ of converter cells to which the modulator has been assigned. Each group $250\_1, 250\_2, \ldots, 250\_N$ includes a respective plurality of converter cells $\{240\_1\_1, 240\_1\_2, \ldots, 240\_1\_M_1; 240\_2\_1, 240\_2\_2, \ldots, 240\_2\_M_2; \ldots; 240\_N\_1, 240\_N\_2, \ldots, 240\_N\_M_N\}$, where $M_j$ is an integer corresponding to a number of converter cells in group number j. As described earlier herein, the number and types of converter cells in each group may be different.

The modulators $260\_1, 260\_2, \ldots, 260\_N$ are operated in parallel, where each modulator $260\_1, 260\_2, \ldots, 260\_N$ operates (i.e. control its respective converter cells) in accordance with its respective reference part $220\_1, 220\_2, \ldots, 220\_N$. As part of the parallel operation, each modulator $260\_1, 260\_2, \ldots, 260\_N$ individually controls its respective converter cells such that e.g. an output voltage of a group controlled by each modulator matches the reference part assigned to the modulator.

In a more specific example, the main reference 210 may for example be a voltage reference $V_{ref}$ indicating a desired output voltage across the full phase arm. In the step 212, the voltage reference $V_{ref}$ is divided into reference parts $V_1, V_2, \ldots, V_N$, which are then provided to a respective one of the modulators $260\_1, 260\_2, \ldots, 260\_N$. As an example, each reference part may correspond to one Nth of the main reference, such that $V_1 = V_2 = \ldots = V_N = V_{ref}/N$. Such a construction may assume e.g. that there is an equal number of converter cells in each group of converter cells, i.e. that $M_1 = M_2 = \ldots = M_N$. If such is not the case, or if not suitable for other reasons, it may be envisaged instead that e.g. $V_j = V_{ref} * k_j$, where $k_j$ is a weighting factor which may e.g. depend on both N but also on and therefore be different for each or some of the groups and modulators. It may for example be such that the reference parts are constructed so that a sum of all $V_j$'s corresponds to, i.e. equals or at least approximates, $V_{ref}$.

In this or other embodiments, the main reference (e.g. $V_{ref}$) may vary over time (e.g. $V_{ref}(t)$). The reference parts may then be constructed such that, at a time instance, the modulators may be operated in parallel according to their respective reference parts, such that at the same time instance the phase arm is operated in accordance with the main reference. Phrased differently, each reference part may then be constructed such that $V_j(t)$ is a function of $V_{ref}(t)$. If, for example, $V(t)=\sin(a*t)$, where a is some constant, $V_j(t)$ may equal e.g. $V(t)/N$, or $V(t)*k_j$, as described above, or similar.

The examples given above are of course only particular examples of how the reference parts may be constructed, and it is envisaged that many other alternatives, that would fall under the concept of the present disclosure, exist.

Several benefits of the concept of the present disclosure will now be described in more detail. It is noted that, if not explicitly stated to the contrary, such benefits apply to all embodiments according to any aspect of the present disclosure described herein.

During operation of an MMC, a phase arm of the MMC may continuously switch between being in a charging cycle (when current in the phase arm moves in a first direction) and being in a discharging cycle (when the current in the phase arm moves in a second direction opposite to the first direction). During the charging cycle, control of the phase arm may require determining which of the converter cells that are to be in an inserted state such that their storage capacitor(s) may be charged. One strategy of control may e.g. include measuring the cell voltages (i.e. the charge currently stored in the cell capacitors), and to insert the converter cells currently having the lowest cell voltages (i.e. the converter cells corresponding to the lowest stored energy). To do so, it may be required to sort all of the converter cells according to their cell voltages. Such a sorting operation may include constructing a list of all the voltages, and then sort the list according to a sorting criterion (such as e.g. a descending or increasing cell voltage). Likewise, during a discharging cycle, one strategy of control may include inserting the converter cells currently having the highest cell voltages (i.e. the converter cells corresponding to the highest stored energy). Such a strategy may thus also require a sorting operation.

As the direction of the current in the phase arm may change several times per second, and as an update of the main reference value may be required ever more so often, the list of cell voltages may be updated and resorted a large number of times per second.

In a conventional MMC, wherein the converter cells of a phase arm are not controlled in accordance with the present disclosure, all converter cells may be controlled according to a single main reference, using a single modulator for the phase arm. For modern MMCs, the number of converter cells in each arm may be large (e.g. including at least several hundred or more of converter cells), and the time needed for controlling the phase arm for each time instance may thus be large, as each sorting operation may require a sorting of several hundred items or more. This may increase latency and put an increased demand on both hardware and software in terms of e.g. required speed and memory consumption.

In an MMC making use of the present disclosure, however, the task of e.g. sorting may be divided into multiple smaller tasks, which may be executed in parallel where each modulator independently sorts a much smaller list each time. This may decrease latency and ease the requirements on e.g. hardware performance. Especially, as each modulator is faced with a simpler task, the individual modulators may be constructed less complex than a conventional modulator responsible for control of all of the converter cells of a phase arm.

An additional benefit may be that the converter cells of a group of converter cells controlled by one modulator may be of a different type than those of a group of converter cells controlled by another modulator. For example, one group may include converter cells of a full-bridge type, while another group may include converter cells of a half-bridge type. As the modulators may each be constructed to handle and control a particular type of converter cell, the present disclosure may provide an improved way of handling such mixed-type phase arms. In a conventional MMC, mixed-type phase arms would require the single modulator to be more complex, as it would e.g. be required to account for the differences between the different converter cell types in the phase arm it controls.

The use of multiple independent modulators according to the present disclosure may also for example enable "on-the-fly" maintenance of converter cells in the phase arm. For example, instead of having to shut a whole arm down (and thereby most likely also shut down the full MMC), it may be envisaged that for example the converter cells in a single group (and/or the modulator itself controlling the converter cells in that group) may be replaced or repaired while the converter cells in the other groups, controlled by another modulator, continues in operation. Likewise, independent modulators may also enable "on-the-fly" addition and removal of one or more modulators (and thereby of groups of converter cells).

In summary, the present disclosure provides an improved way of controlling an MMC. This is achieved by, for a phase arm of the MMC, dividing (physically or logically) the converter cells of the phase arm into several groups, where each group of converter cells may be controlled by its own modulator which may, independent of and in parallel with the other modulators, execute a task of controlling the group of converter cells according to a reference part of a main reference (and to e.g. perform cell voltage balancing within the group). As a result, latency may be reduced. This may further allow to increase a control bandwidth of the MMC such that the MMC may provide e.g. positive damping and control in higher frequency harmonics. Additionally, the control software and/or hardware for each individual modulator may be made less complex, as each modulator is required only to solve part of a full task (such as e.g. sorting of a large list of converter cells according to a sorting criterion).

Although features and elements may be described above in particular combinations, each feature or element may be used alone without the other features and elements or in various combinations with or without other features and elements.

Additionally, variations to the disclosed embodiments may be understood and effected by the skilled person in practicing the claimed invention, from a study of the drawings, the disclosure, and the appended claims. In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of controlling a plurality of converter cells in a phase arm of a modular multilevel converter (MMC) in accordance with a main reference, including:

dividing the main reference into a plurality of reference parts, and by using a grouping of the plurality of converter cells into a plurality of groups, operating a plurality of modulators in parallel, each modulator controlling a respective one of the groups of converter cells in accordance with one of the reference parts, each modulator controlling its respective group of converter cells according to a sorting criterion, and each modulator balancing a voltage of its respective group of converter cells based on said sorting, wherein:

one of the groups of converter cells controlled by one of the modulators includes converter cells of a first type, and another one of the groups of converter cells controlled by another one of the modulators includes converter cells of a second type different from the first type, the main reference is a voltage value, the reference parts are constructed according to a weighting factor based at least in part on a number of converter cells in a group, such that a sum of the reference parts corresponds to said voltage value, and said sorting criterion includes an increasing or decreasing converter cell voltage.

2. A phase arm for a modular multilevel converter (MMC), wherein the phase arm includes a plurality of modulators and a plurality of converter cells groupable into a plurality of groups of converter cells, and wherein:

one of the groups of converter cells controlled by one of the modulators includes converter cells of a first type, and wherein another one of the groups of converter cells controlled by another one of the modulators includes converter cells of a second type different from the first type, each modulator is configured to receive a reference part of a main reference and to, independent of and in parallel with any other modulator in the phase arm, control a respective one of the groups of converter cells in accordance with the received reference part, each modulator controlling its respective group of converter cells according to a sorting criterion, and each modulator balancing a voltage of its respective group of converter cells based on said sorting, wherein said sorting criterion includes an increasing or decreasing converter cell voltage, and the phase arm is configured to:

receive the main reference as a voltage value, divide the received main reference into a plurality of reference parts according to a weighting factor based at least in part on a number of converter cells in a group, such that a sum of the reference parts corresponds to said voltage value, and provide one of the reference parts to each modulator.

3. The phase arm of claim 2, wherein the first type is a half-bridge (HB) converter cell type and the second type is a full-bridge (FB) converter cell type.

4. A modular multilevel converter (MMC) including at least one phase arm according to claim 3.

5. A converter station, including at least one MMC according to claim 4.

6. A modular multilevel converter (MMC) including at least one phase arm according to claim 2.

7. A converter station, including at least one MMC according to claim 6.

* * * * *